Figures 1, 2:
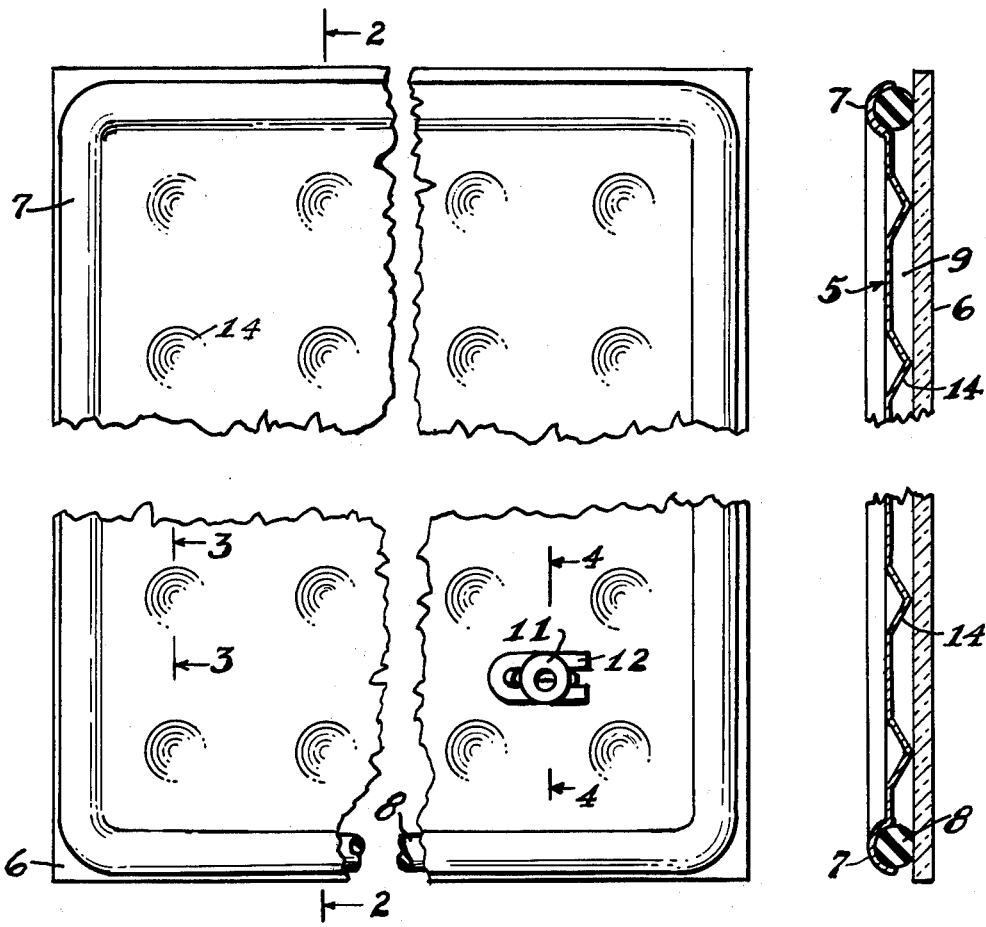

United States Patent [19]

Stelzer

[11] 4,051,832
[45] Oct. 4, 1977

[54] SOLAR HEATING PANEL

[76] Inventor: William Stelzer, 1354 Blue Heron Drive, Milford, Mich. 48042

[21] Appl. No.: 761,497

[22] Filed: Jan. 21, 1977

Related U.S. Application Data

[63] Continuation of Ser. No. 678,167, April 19, 1976, abandoned.

[51] Int. Cl.² .............................................. F24J 3/02
[52] U.S. Cl. ..................................... 126/270; 126/271
[58] Field of Search ............... 126/270, 271; 237/1 A; 60/641; 220/9 C, 63 R

[56] References Cited

U.S. PATENT DOCUMENTS

| | | | |
|---|---|---|---|
| 2,469,496 | 5/1949 | Christenson | 126/271 |
| 3,893,443 | 7/1975 | Smith | 126/271 |
| 3,961,619 | 6/1976 | Estes et al. | 126/271 |

Primary Examiner—Kenneth W. Sprague
Assistant Examiner—James C. Yeung

[57] ABSTRACT

A solar heating panel for converting the sun's rays into heat, comprising a pane of glass, a sheet metal panel behind said pane of glass in spaced relationship therewith, a peripheral hermetical seal between the pane of glass and said sheet metal panel, a vacuum in the space between said pane of glass and said sheet metal panel, said sheet metal panel having a blackened surface facing said pane of glass, and evenly spaced projections pushed out of the plane of said sheet metal panel having sharp points resting against said pane of glass to resist the atmospheric pressure acting on said pane of glass and said sheet metal panel, said blackened surface serving to convert the solar rays into heat to heat up said sheet metal panel, where the heat produced can be carried away by any conventional means, most conveniently by flowing air blown over the back surface of the sheet metal panel to heat a heat sink or a building.

3 Claims, 4 Drawing Figures

SOLAR HEATING PANEL

This is a continuation of application Ser. No. 678,167, filed Apr. 19, 1976, abandoned.

The invention relates to solar heating panels, a plurality of which may be used mounted in a vertical or slanted position to catch the sun's rays to convert them into heat for heating a building or for some other useful purpose.

The object of the invention is to increase the efficiency of the solar heating panel by having an evacuated space between a pane of glass and a sheet metal panel so that practically no heat is lost to the outside by convection or conduction.

Another object is to resist the atmospheric pressure, which forces the pane of glass and the sheet metal panel toward each other, by pointed projections extending from the sheet metal panel to rest against the glass, the point contact causing only a minimum heat loss.

Another object is to improve the insulation between the sheet metal panel and pane of glass by means of the vacuum so that the glass pane is not heated up and remains at approximately ambient temperature, whereby there is less chance of glass breakage due to heat.

A further object is to coin the tips of the projections that touch the glass to thereby make the metal harder and to reduce the area of the point of contact to further reduce the loss of heat from the sheet metal panel to the glass.

The invention also aims to provide an inexpensive peripheral hermetical seal to contain the vacuum, and to provide a connection adapted to be connected to a vacuum pump or source of vacuum for use in the manufacture of the panel or for reevacuating the air after the panel has been in use and the vacuum has been accidentally lost or reduced.

Figures 3, 4:
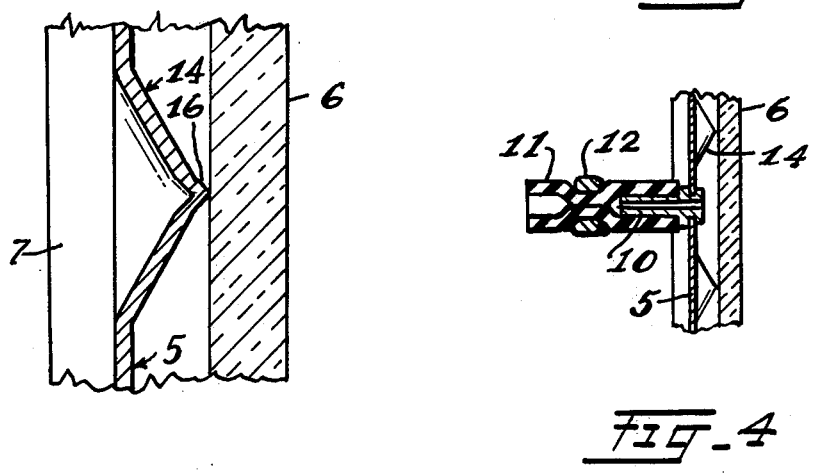

Other objects and advantages of the present invention will become apparent from the following detailed description taken in conjunction with the drawing, wherein:

FIG. 1 is a back view of the solar heating panel incorporating the invention, part being broken off in order not to encumber the drawing;

FIG. 2, a section taken on line 2—2 of FIG. 1;

FIG. 3, an enlarged section taken on line 3—3 of FIG. 1 showing one of the evenly spaced projections; and FIG. 4, a section taken on line 4—4 of FIG. 1, showing the vacuum connection.

Referring now to the drawing, a sheet metal panel 5 is placed against a glass pane 6, leaving a space therebetween. The sheet metal panel 5 has a rim 7 curved in cross-section to receive a peripheral seal 8 to hermetically seal the space 9 between the glass pane 6 and sheet metal panel 5 so that the air can be evacuated. For this purpose a vacuum connection in the form of a tube connection 10 is provided. An elastomeric tubing 11 is slipped over the connection 10 and squeezed together by a U-shaped clamp 12 so that it is sealed. The sheet metal panel 5 has a plurality of projections 14 pressed out of the plane of the panel. The detail in FIG. 3 is typical and shows the tip 16 of a conical projection 14 touching the glass pane. This tip 16 is coined so that the metal is thereby hardened and extruded to form a relatively sharp point. The harder the metal is the sharper can be the point, and the sharper the point is the less heat is transmitted from panel 5 to the glass. The side 18 of the sheet metal panel facing the glass and exposed to the rays of the sun is blackened to convert the sun's rays into heat and to thereby heat up the sheet metal panel 5. The glass pane has the characteristic of letting the sun rays through but reducing the long wave heat radiation from the metal panel to the outside. The metal panel 5 may be made of aluminum, in which case the blackened surface may be obtained by black anodizing. It is desirable that the sheet metal be as thin as permissible not only to more quickly conduct the heat from the blackened surface to the back side 21 but also to prevent too much rigidity which might put a strain on the glass pane if the panel is not perfectly flat. The area between the conical projections 14 must be strong enough to withstand the atmospheric pressure, but the panel as a whole should not have too much rigidity in order to easily conform to the glass pane 6. The latter must be thick enough so that the area between the points against which it rests can withstand the atmospheric pressure. The seal 8 is shown as an O-ring seal, which is inexpensive and easy to install. It must be made of heat resistant elastomeric material, such materials being known in the art and also have the characteristic of not taking a set. The seal may be bonded to the groove of bead 7 to make the assembly of the panel easier. The area of seal 8 exposed to the atmosphere may be wetted with a nonvolatile sealer after assembly to further improve the seal. The recess in bead 7 not only facilitates the assembly of the O-ring seal, but also provides a wedging action so that the atmospheric pressure acting on the seal tends to keep it in contact with the glass pane. After evacuation of the air, the solar heating panel becomes a rigid unit, the sheet metal panel and the glass pane being pressed together by the atmospheric pressure and held by friction. Thus it is not necessary to provide a frame or clamping means. The unit can be installed directly in the framework and structural supports of a solar heating system and the details of mounting, securing, and sealing against rain must be determined according to the structure where it is used. The number of units used is also a matter of application. The size of the panel is determined by cost, for which the cost of manufacturing and the ease of handling and shipping must be taken into consideration.

It is obvious that if the vacuum in space 9 is reduced or lost entirely, the panel cannot function efficiently, as the glass would heat up. This heating up would be an indication of the loss or reduction of vacuum. In case of failure of one of the structural members of the panel replacement or repair would be required, otherwise the mere reduction in vacuum could be remedied by connecting a vacuum line to hose 11, removing clamp 12, and replacing it after the vacuum is reestablished. For this purpose the connection 10 must be accessible, and if necessary the connection 10 may be made longer so that the hose 11 is remote from the metal panel where it is easily accessible and where the temperature is lower.

The embodiment shown is calculated to fulfill the objects above stated, but it will be appreciated that the invention is susceptible to modification, variation and change without departing from the scope or fair meaning of the invention.

I claim:

1. A solar heating panel for converting the sun's rays into heat, comprising a single, flat pane of glass, a sheet metal panel behind said pane of glass in spaced relationship therewith to provide a space between said pane of glass and said metal panel, said sheet metal panel and said pane of glass having peripheral outer portions, a peripheral hermetical seal between said outer portion of said pane of glass and said outer portion of said sheet metal panel, a vacuum in said space, said sheet metal panel having a blackened surface facing said pane of glass, evenly spaced projections pushed out of the plane of said sheet metal panel having sharp points resting against said pane of glass to resist the atmospheric pressure acting on said pane of glass and said sheet metal panel, said blackened surface serving to convert solar rays into heat to heat up said sheet metal panel. A vacuum connection arranged to be in communication with said space containing said vacuum, and means to close off said vacuum connection.

2. The invention set forth in claim 1, said points of said projections being coined to make said points harder and sharper so that less heat can be transmitted to said pane of glass.

3. The invention as set forth in claim 1, said peripheral hermetical seal being made of elastomeric material and circular in cross-section, said outer portion of said sheet metal panel being formed to conform to said peripheral hermetical seal and to cooperate therewith so that the atmospheric pressure acting on said seal tends to increase the engagement of said seal with said sheet metal panel and said pane of glass.

* * * * *